April 10, 1956  W. H. SKILLING  2,741,662
TELEGRAPHIC APPARATUS

Filed July 7, 1953  5 Sheets-Sheet 1

INVENTOR
WILLIAM H. SKILLING
BY
Fetherstonhaugh & Co.
ATTORNEYS

April 10, 1956 W. H. SKILLING 2,741,662
TELEGRAPHIC APPARATUS
Filed July 7, 1953 5 Sheets-Sheet 2

INVENTOR
WILLIAM H. SKILLING
BY
Fetherstonhaugh & Co.
ATTORNEYS

April 10, 1956  W. H. SKILLING  2,741,662
TELEGRAPHIC APPARATUS
Filed July 7, 1953  5 Sheets-Sheet 3

INVENTOR
WILLIAM H. SKILLING
BY
Fetherstonhaugh&Co.
ATTORNEYS

April 10, 1956 W. H. SKILLING 2,741,662
TELEGRAPHIC APPARATUS
Filed July 7, 1953 5 Sheets-Sheet 5

INVENTOR
WILLIAM H. SKILLING.
BY
Fetherstonhaugh & Co.
ATTORNEYS

United States Patent Office 2,741,662
Patented Apr. 10, 1956

2,741,662

TELEGRAPHIC APPARATUS

William H. Skilling, Vancouver, British Columbia, Canada

Application July 7, 1953, Serial No. 366,408

16 Claims. (Cl. 178—33)

This invention relates to improved telegraphic apparatus.

An object of the present invention is the provision of telegraphic apparatus which is adapted to send or receive messages.

Another object is the provision of telegraphic apparatus for sending or receiving symbols and which uses only one signal pulse for each symbol.

A further object is the provision of telegraphic apparatus having considerably fewer parts than any existing machine for doing a similar job, thus reducing the cost thereof to such an extent that this apparatus may be used in many places where it is now not possible to use the existing machines.

Yet another object is the provision of telegraphic apparatus which is an improvement over existing equipment since it has fewer moving parts, less wear, requires less maintenance, is easier to assemble and disassemble and repair, requires less skillful repair and entails less delay during repair.

Yet another object is the provision of telegraphic sending and receiving apparatus which is capable of being used with any class of telegraph wire.

Yet another object is the provision of telegraphic apparatus which is capable of sending more symbols while operating at a slower speed than the known types of equipment for similar work.

A further object is the provision of telegraphic sending apparatus and telegraphic receiving apparatus which cannot very easily get out of synchronization with each other, and which are automatically re-synchronized.

Still another object is the provision of telegraph transmitters and receivers which may be connected by wire and a ground return, by wire and metallic return, or tied into the keying circuit of a radio transmitter and the output circuit of a radio receiver.

Still another object is the provision of telegraphic apparatus which requires no extra pulse to be induced by machine into the motor winding in order to synchronize the speed of the motor of each machine with the motors of the other machines.

Yet another object is the provision of telegraphic apparatus including a plurality of machines for sending to and receiving from each other which are not too dependent on the R. P. M. relationship of operating motors with each other.

A still further object is the provision of telegraphic apparatus that is light in weight, easily movable from one position to another, and is not a permanent fixture.

Still another object is the provision of telegraphic apparatus which is much smaller in size than the known types of apparatus for the same purpose which may be used on a wire or wireless so that it is adapted for field operation and automotive or small boat operation.

Still another object is the provision of telegraphic apparatus, the motor power of which may be a direct current or alternating current motor.

A further object is the provision of telegraphic apparatus which does not require a highly trained person to operate it.

A still further object is the provision of telegraphic apparatus, the telegraph line or radio wires of which may be connected to a plug or an adapter so that they may be plugged into different circuits.

This telegraphic apparatus consists of a machine which is capable of both sending and receiving symbols. These symbols usually are in the form of letters, numerals, and punctuation marks so that a message may be typed on the transmitter and printed by the receiver. Each symbol is sent out as a single pulse or signal. The pulses are formed by opening and closing a line circuit.

Each machine includes a plurality of keys similar to typewriter keys, each of which represents a symbol. A common shaft is used, having one or more distributor arms fixed thereon, each arm having contacts adapted to engage segment contacts arranged in the path of the arm to close the circuit of a locking magnet. This same shaft has a locking wheel and a printing wheel fixed thereon. Suitable clutch means is provided for selectively connecting the shaft to a motor for rotation. There is at least one symbol on the printing wheel for each key, and there is a notch on the locking wheel for each symbol of the printing wheel. Each of these symbols has a corresponding contact segment.

The shaft is normally locked in a stationary position. When a key is depressed, the shaft is rotated until the symbol of the depressed key on the printing wheel is moved to a certain position in line with suitable printing mechanism. At this time, the contact on the distributor arm has engaged the segment of that particular symbol and the locking magnet is energized to cause the shaft to be locked in this position. At the same time as the locking magnet is energized, the printing mechanism is operated to press a tape against the selected symbol on the printing wheel, said wheel being inked in any convenient manner. When the depressed key is released, the locking magnet circuit is broken, so that the distributor arm either returns to a rest position or is influenced by another depressed key. When the shaft is rotating for this action, the printing mechanism is released and, at the same time, the mechanism is set into motion for moving the tape a predetermined distance, where it is ready for the next symbol.

In the form of this invention which is to be used in telegraph line work, the machine includes a line relay connected to the line. A current normally flows over the line and keeps this relay energized. The relay keeps a relay switch closed, which is in the circuit of the locking magnet, so that said magnet is normally energized. When a key is depressed, the circuit of the line relay is broken and the locking magnet is de-energized, thus allowing the main shaft to turn. Any number of these machines may be connected together for sending and receiving the symbols and each machine has a line relay, and these relays are connected in series. When one machine is sending, the other machines are receiving. The relays of the receiving machines are energized and de-energized each time the relay of the sending machine is energized or de-energized. Thus, the receiving machines function exactly in the same manner as the sending machines. In other words, the receiving machines are operated by the keyboard of the sending machines.

Examples of this invention are illustrated in the accompanying drawings, in which, Figure 10 is a wiring diagram of this apparatus, Figure 11 diagrammatically illustrates the segment arrangement forming part of the re-synchronization mechanism, Figure 12 diagrammatically illustrates a locking wheel to be used in the re-synchronizing mechanism, Figure 13 diagrammatically illustrates the wiring hook-up with a radio transmitting circuit, and Figure 14 diagrammatically illustrates the hook-up with a radio receiving circuit.

This apparatus consists of a frame 10 which is somewhat similar to an ordinary typewriter frame. A distributor plate 11 projects upwardly from the frame and a standard 12 also projects upwardly from the frame spaced from and to the rear of the plate 11, said standard having a bearing 13 at the upper end thereof. Another bearing 14 is located centrally of the distributor plate. A main shaft 17 is rotatably carried by the bearings 13 and 14 and projects beyond said bearings.

One or more distributor arms 20 is or are fixedly mounted on the front end of the main shaft. It is preferable to have two of these arms, as shown, or three of them. In the illustrated example, two arms 20 are formed by a single bar so that they are 180° apart in relation to each other. If three arms are used, they would be in the form of a Y, in which case they would be 120° from each other.

Figure 5:
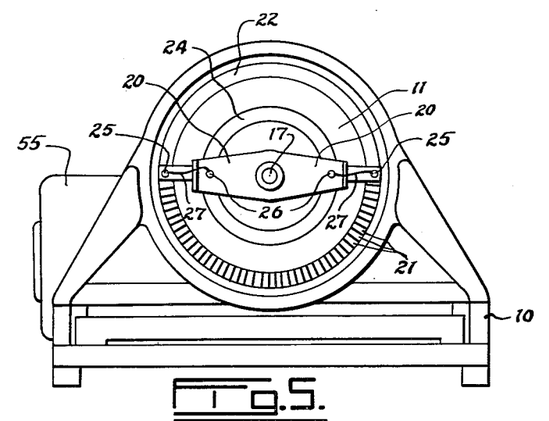
Figure 5 is a front elevation of the machine.

A plurality of independent electrical segments 21 are arranged in a circular path on the plate 11. These segments are insulated from each other. If only one arm 20 is used, these segments will form a circle. When two arms are used, these segments form a semi-circle, and the circle is completed by a blank strip 22, see Figure 5. The more arms used, the smaller the portion of the circle taken up by the segments. For example, if three arms are used, the segments would cover one-third of a circle, and the strip 22 two-thirds thereof. A contact ring 24 is mounted on the distributor plate and is spaced inwardly of the segments 21 and strip 22, and is concentric therewith. Spaced brush contacts 25 and 26 are carried by each distributor arm and are adapted to engage the segments 21 and the ring 24, respectively. These contacts are electrically connected by a wire 27, but are insulated from the arm.

Figure 2:
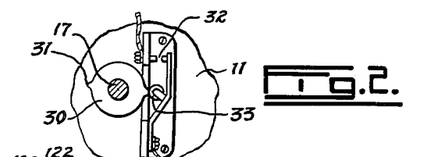
Figure 2 is a fragmentary detail of a cam switch used in this apparatus.

A circular cam 30 having one or more projections 31 on its surface is fixedly mounted on the main shaft just inside the plate 11. There is a projection for each distributor arm 20 so that in this example there are two of them. A switch 32 is mounted on the back of the plate adjacent the cam, see Figure 2. This switch is normally closed but it is opened by each projection 31 when the latter engages a roller 33 mounted on said switch.

Figure 6:
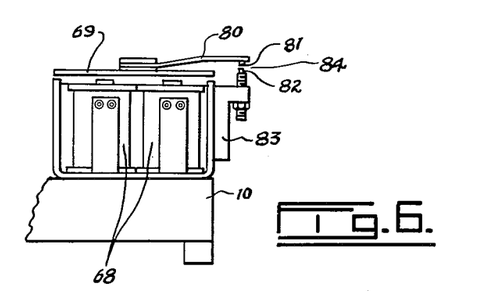
Figure 6 is an enlarged detail of the locking magnet arrangement and the printing switch.

A driven positive clutch disc 35 is fixedly mounted on the shaft 17 and has one or more lugs 36 projecting outwardly from a side thereof adjacent its periphery. A driving positive clutch disc 37 is slidably mounted on and rotatable with one end of a sleeve 38 which is rotatably mounted on the main shaft. This disc is provided with a flange 39 having a plurality of teeth 40 formed therein adapted to be engaged by the lug or lugs 36 of the driven disc. This sleeve is provided with a guideway 43 into which a yoke ring 44 fits, said ring being pivotally connected to a yoke 45 pivotally mounted at 46, see Figure 3, on a suitable support carried by the frame 10. The yoke extends downwardly from its pivot point in a single piece 47 which forms an armature for a clutch electromagnet 48 mounted on the frame beneath the main shaft. A spring 49 normally pulls the armature away from the magnet when the latter is de-energized. It is obvious that another electromagnet may be used in place of the spring 49, see Figure 6.

A worm gear 52 is mounted on the sleeve 38 and meshes with a worm 53 secured to the drive shaft 54 of an electric motor 55 carried by the frame to one side of the main shaft. When this motor is operating, the sleeve 38 and the driving positive clutch disc 37 are rotating, but said disc is normally spaced from the driven disc 35 by the spring 49. When the magnet 48 is energized, the armature 47 is drawn to it, thus moving the yoke 44 to cause the teeth 40 of the driving disc to engaged with the lug or lugs 36 of the driven disc. This rotates the main shaft.

A relatively large notched locking wheel 59 is fixedly mounted on the main shaft, outside the bearing 13. A printing wheel 60 is also fixedly mounted on the shaft adjacent the locking wheel. The printing wheel has symbols 61 such as letters, numbers and punctuation marks, mounted on its periphery. There is one complete set of these symbols for each distributor arm. There is one symbol 61 in each set of said symbols, for each segment 21 on the distributor plate, and each set of these symbols takes up the same proportion of the periphery of the printing wheel as the segments take up of the circle formed thereby either alone or along with the strip 22. For example, if the segments form a complete circle, one complete set of the symbols extends all the way around the printing wheel, or if the segments form a semi-circle, one complete set of the symbols extends half around the wheel and another complete set extends around the second half thereof. If segments 21 are reduced to one-third circumference of plate 11, then three arms 20 are used and three complete sets of symbols 61 take up full circumference of wheel 60, each set of symbols covering a third of the circumference of the wheel 60. Furthermore, there is a notch 64 in the periphery of the wheel 59 for each symbol 61 on the printing wheel and in line therewith. It will be noted that each notch opens outwardly in the direction of rotation of the wheel, see the arrow in Figure 4, and is substantially V shaped.

A pair of locking magnets 68 are mounted on the frame 10 at one corner thereof and have a common armature 69. A locking arm 70 is connected to the armature 69 and extends inwardly of the frame and beneath the wheel 59. This arm is pivotally mounted at 71, see Figure 4, so that when the armature is drawn downwardly by the magnets, the inner end of said arm is raised. A locking tooth 72 projects upwardly from the inner end of this arm and is adapted to fit into the notches 64 of the wheel 59. Contacts 75 and 76 are mounted on and insulated from the arm 70 and the frame beneath said arm, respectively, and form a clutch switch 77 which is in circuit with the clutch magnet 48. When the locking magnets are energized, the tooth 72 is moved into one of the notches of the locking wheel, and when said magnets are de-energized, the switch 77 is closed.

A supporting arm 80 is mounted on and insulated from the armature 69 and has a contact 81 in line with another contact 82 carried by a bracket 83 supported by the frame 10. The contacts 81 and 82 are open when the locking magnets 68 are de-energized, and they form a printing magnet switch 84.

A printing electromagnet 88 is carried by a support 89 located at the back of the frame 10 and carried thereby. An armature 90 is provided for this magnet and has an arm 91 projecting outwardly therefrom towards the frame, said arm being pivotally mounted at 92, see Figure 3. A spring 94 normally pulls the inner end of said arm downwardly, thus keeping the armature 90 away from the magnet 88. A contact 95 is carried by and insulated from this armature, and normally engages a contact 96 located above it, said contacts forming a tape-moving switch 97. The contact 96 is carried by and insulated from a bracket 98 extending upwardly from the support 89.

Figure 7:
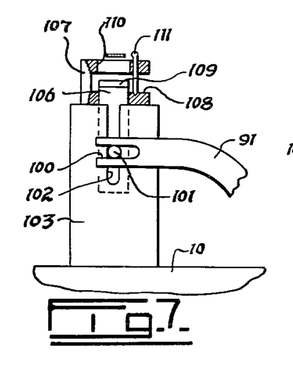
Figure 7 is an enlarged detail of the printing mechanism, partly in section.
Figure 8:
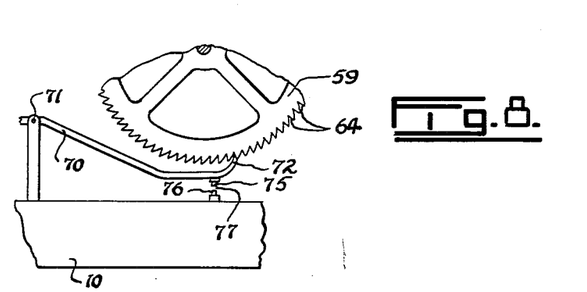
Figure 8 is a fragmentary detail of the shaft locking mechanism.
Figure 9:
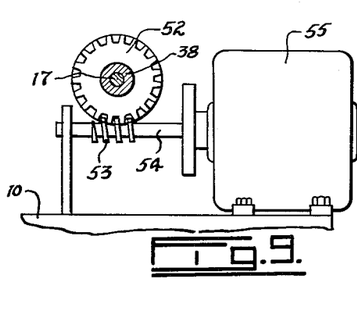
Figure 9 illustrates the driving connection between the motor and the main shaft.

The inner end of the arm 91 is bifurcated at 100 and engages a pin 101 extending outwardly through a vertical slot 102 in a cylinder 103 which is mounted on and extends upwardly from the frame 10, see Figure 7. The pin 101 is connected to a piston 106 which rides in the cylinder 103 and projects upwardly therefrom. A head 107 is mounted on the upper end of this cylinder and has a horizontal slot 108 extending therethrough. A resilient pad 109 is mounted on the piston which extends into the slot 108 directly beneath an opening 110 formed in said head above the slot. A pin 111 removably extends downwardly through the head and its slot to one side of the piston 106 and opening 110.

A printing tape normally extends through the slot 108 of the head 107 on top of the piston 106 and its pad 109. This piston and the opening 110 are directly in line with the symbol on the printing wheel 60, located at locking and printing position. When the printing magnet 88 is energized the tape-moving switch 97 is opened and the bifurcated end of the arm 91 is raised. This moves the piston 106 upwardly and presses the printing tape through the opening 110 against the symbol. When the magnet 88 is de-energized, piston 106 drops clear of the printing wheel, and the switch 97 closes.

Figure 4:
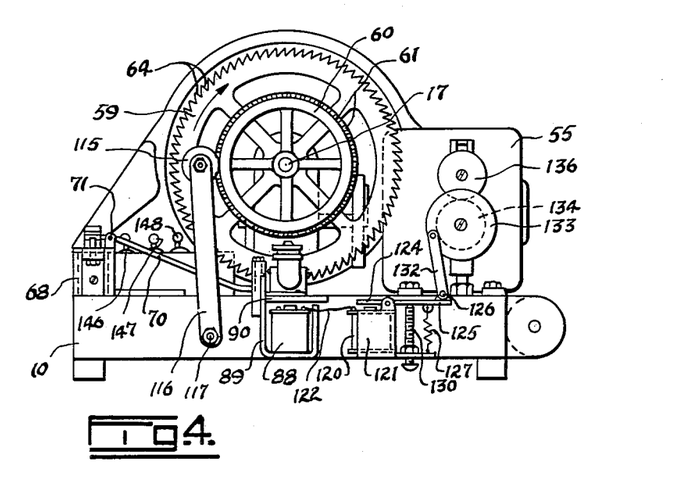
Figure 4 is an elevation of the back of the machine.

An inking roller 115 is rotatably mounted on the upper end of an arm 116 pivotally connected to the frame 10 at 117, see Figure 4. A spring 118 connected to the arm 116 and to the support 89 draws the arm towards the printing wheel so that the inking roller 115 is always in engagement with the periphery of the printing wheel to keep ink on the symbols thereof.

A tape-moving magnet 120 is carried by a bracket 121 mounted on the back of the frame 10 to one side of the printing magnet 88. A wire 122 connects one side of this magnet to the contact 96 of the switch 97. An armature 124 is provided for the magnet 120 and has an arm 125 projecting outwardly therefrom along the back of the frame 10. This arm is pivotally mounted at 126, and its outer end is normally pulled downwardly by a spring 127, thus normally retaining the armature 124 away from its magnet. An adjustable stop 130 is provided for limiting the downward movement of the arm 125, and a link 132 connects the outer end of this arm with a ratchet arrangement 133 of any well-known construction, which is adapted intermittently to move a roller 134 over which the printing tape, previously referred to, extends. A spring-loaded roller 136 presses the tape against the roller 134.

When the switch 97 is closed, the tape-moving magnet 120 is energized, attracting the armature 124 to it. This moves the outer end of the arm 125 and the link 132 upwardly to cause the ratchet 133 to rotate the roller 134 a predetermined distance. When the switch 97 is opened, the tape-moving magnet is de-energized, and the spring 127 draws the outer end of the arm 125 of the link 132 downwardly. This turns the ratchet 133 back but does not move the roller 134.

The electromagnets referred to above, are included in an electrical circuit which will hereinafter be described. Direct current is supplied to these magnets from any suitable source and in any convenient manner. This current may come directly from a D. C. source, or a suitable rectifier 140, such as a selenium stack rectifier, may be connected to the electrical circuit for changing current from an A. C. source to a direct current.

Figure 1:
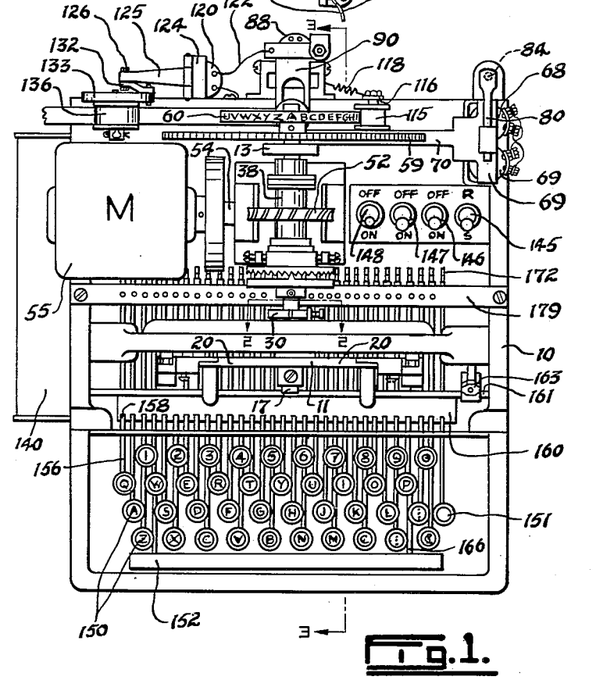
Figure 1 is a plan view of the telegraphic apparatus which is used as a transmitter and a receiver.

This machine is provided with a double acting send-receive switch 145, motor switch 146, printing and tape switch 147, and clutch switch 148, see Figure 1. The switch 145 is moved to one position for sending and to its other position for receiving. The switch 146 cuts in the motor 55, the switch 147 cuts in the printing magnet 88 and therefore cuts in tape-moving magnet 120, and the switch 148 cuts in the clutch magnet 48.

Whether the telegraphic apparatus is set for receiving or sending, the locking magnets 68 are normally energized. At this time, the tooth 72 of the locking arm 70 is engaged in a notch of the locking wheel 59 to prevent the main shaft and the parts fixed thereto from rotating. At this time, the clutch switch 77 is open so that the clutch magnet 48 is de-energized, allowing the spring 49 to separate the clutch discs 35 and 37. The motor 55 is rotating the disc 37 but it is free of the lug or lugs 36 so that it is not attempting to rotate the main shaft. When the locking magnets are de-energized, the locking arm 70 disengages the locking wheel so that the main shaft may now rotate. At the same time, the clutch switch 77 is closed, energizing the clutch magnet 48 to move the clutch disc 37 towards the disc 35. At this time, the lug or lugs 36 engage the teeth 40 of the driving disc and the main shaft is rotated. When the selected symbol is in line with the printing piston 106, the locking magnets are energized in a manner described hereinafter. This pivots the free end of the locking arm 70 upwardly, opening the clutch switch 77 to de-energize the clutch magnet, thereby disconnecting the motor from the main shaft. At the same time, the locking tooth 72 engages one of the notches of the locking wheel to lock the shaft in position with the desired symbol in line with the printing piston.

When the locking magnets 68 were energized, the printing magnet switch 84 was closed, thus energizing the printing magnet 88. This draws the armature 90 downwardly and opens the tape-moving switch 97. At the same time, the arm 91 lifts the piston 106. The printing tape which extends through the slot 108 is pressed by the pad on the piston against the symbol which is in line therewith.

The printing mechanism stays in this position until the locking magnets are again de-energized, opening the switch 84 and de-energizing the printing magnet. The spring 94 draws the arm 91 downwardly to move the printed tape away from the symbol on the printing wheel. At the same time, the switch 97 closes to energize the tape-moving magnet 120. This draws the armature 124 downwardly to cause the ratchet 133 to rotate the roller 134 a predetermined distance. As the roller 136 is pressing the tape against said roller, the tape is moved a predetermined distance and is ready for the next printing position. The magnet 120 remains energized until the printing magnet is again energized to open the switch 97.

A plurality of keys 150 are provided at the front of the frame 10. Each key has a symbol, consisting of a number, letter, or punctuation mark, printed on it. A "Test" key 151 is also provided, along with a spacing bar 152. The keys and spacing bar of this apparatus are arranged in much the same manner as the keys and spacing bar of an ordinary typewriter, see Figure 1. Each of the keys 150 is provided with an arm 156 which extends into the frame 10 and is pivotally mounted on a common shaft 157 extending transversely of the frame. Each of these arms has a hook 158 extending upwardly therefrom and over a tipping bar 160 which extends transversely of the apparatus and is common to all key arms. The tipping bar is fixedly connected to a shaft 161 which extends transversely of the frame 10 and is rotatably mounted thereon. A normally-closed switch 163 is actuated by the shaft 161, and when the outer edge of the bar 160 is tipped downwardly, said switch is opened.

The spacing bar 152 has one or more arms 166 extending into the frame 10 pivotally mounted on a shaft 167 extending transversely of the frame near the shaft 157. Each of the arms 166 has a hook 168 which engages the tipping bar 160 in the same manner as the hooks 158.

Figure 3:
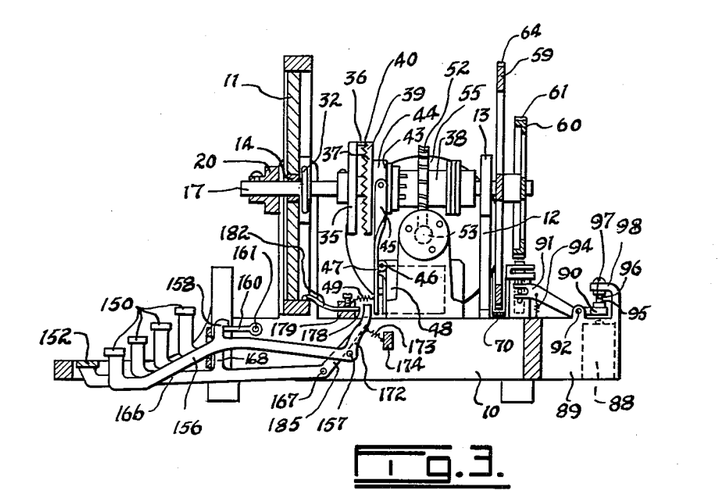
Figure 3 is a longitudinal section through the apparatus taken substantially on the line 3—3 of Figure 1.

Each of the key arms 156 has a finger 172 projecting upwardly therefrom at the point where it is mounted on the shaft 157, see Figure 3. A spring 173 connects each of these fingers to a cross bar 174 extending transversely of and carried by the frame 10. These springs normally draw the fingers towards the rear of the machine to maintain the respective keys in their normal positions. At this time, each finger 172 is spaced from a contact 178 carried by a contact bar 179 extending transversely of the frame. Each of these contacts is connected by a conductor 182 to a segment 21 on the distributor plate 11. Thus, when a key 150 is depressed, the finger 172 of its arm 156 engages a contact 178 which is connected to a segment 21 in line with a symbol on the printing wheel 60, said symbol corresponding with the one on the key in question.

One of the arms 166 of the spacing bar 152 is also provided with a finger 185 which is similar to the fingers 172. This finger is also adapted to engage a contact when the spacing bar is depressed which is connected to a segment 21 which is in line with a blank space on the printing wheel 60. The test key 151 has an arm 156 and a hook 158 the same as the other keys. However, it does not include a finger 172. All this key does is to tip the bar 160 to open the switch 163.

One of the segments 21 lies at a position where the arm 20 normally rests. This segment is connected to the switch 163.

A line relay 190 (shown in Figure 10) is mounted at a convenient point on the frame 10 and controls a relay switch 191. This switch is closed when the relay is energized.

Figure 10:
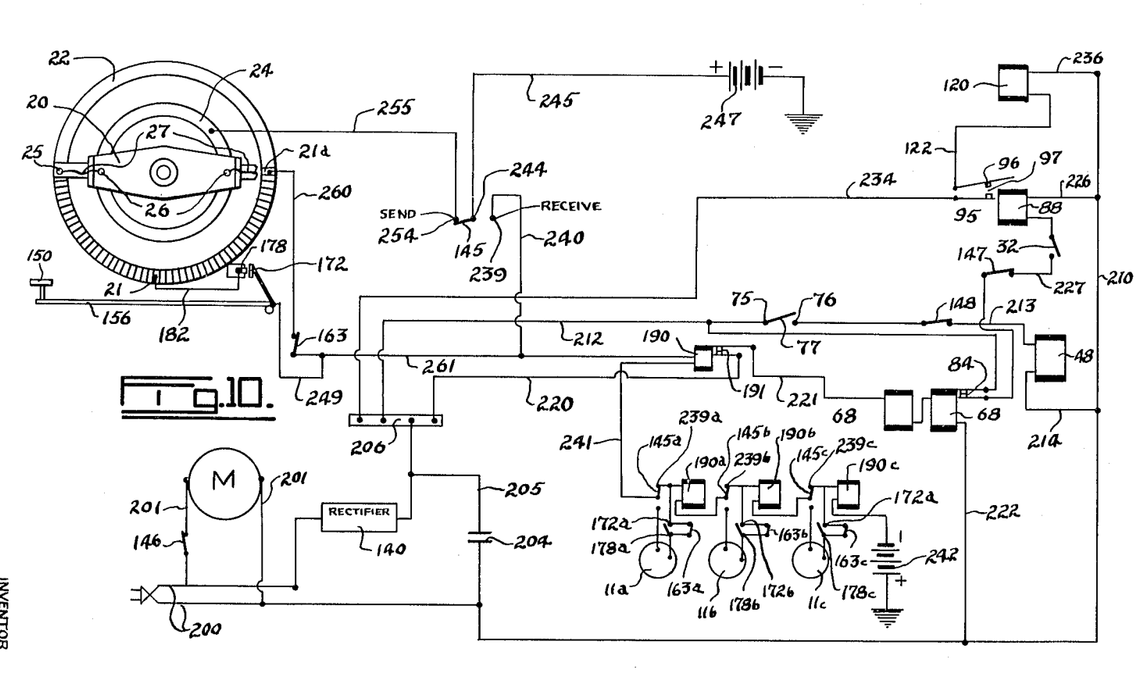

Referring to the wiring diagram of Figure 10, 200 are the wires extending from a suitable A. C. source. The motor 55 is connected to these wires by wires 201, the motor switch 146 being in one side of these wires. One side of the rectifier 140 is connected to one of the wires 200, and one side of a condenser 204 is connected to the other of said wires. The other side of the rectifier and the condenser are connected by a wire 205 to a bus bar 206, supplying the positive side of a D. C. current. In this diagram, a wire 210 represents a common negative D. C. side, for the magnets 48, 68, 88 and 120.

The contact 75 of the clutch switch 77 is connected by a wire 212 to the bus bar 206. The contact 76 of said switch is connected to the clutch magnet 48 by a wire 213, the clutch switch 148 being in this wire, while a wire 214 connects the opposite side of the magnet to the common wire 210.

A wire 220 connects one contact of the relay switch 191 to the bus bar, and a wire 221 connects the other contact of said switch to one side of one of the locking magnets 68, said magnets being connected in series and the other side of the second magnet is connected to the common wire 210 by a wire 222.

One side of the printing magnet 88 is connected by a wire 226 to the common wire 210 and the other side of said magnet is connected by another wire 227 to the wire 212, which in turn is connected to the bus bar. The cam switch 32, printing switch 147 and printing magnet switch 84 are connected in series by the wire 227.

The contact 95 of the tape-moving switch 97 is connected by a wire 234 to the bus bar, while the other contact 96 of the said switch is connected by the wire 122 to one side of the tape-moving magnet 120, the other side of said magnet being connected by a wire 236 to the common wire 210.

The send-receive switch 145 is a single-pole double throw switch. One contact 239 of this switch is connected by a wire 240 to one side of the line relay 190, the other side of said relay being connected into a telegraph line 241, connected to which is a suitable source of D. C. current, such as a battery 242, or a generator. This telegraph line is connected to the negative post of the battery either directly or through a series of any desired number of line relays, such as relays 190a, 190b and 190c of other similar machines and the positive post of the battery is connected to ground. The relays 190, 190b and 190c are respectively associated with their send-receive switches 145a, 145b and 145c and function in the same manner as the relay in the machine being described.

Contact 244 of the switch 145 is connected by a wire 245 to the positive post of a battery 247, the negative post of which is grounded. The side of the line relay connected to wire 240 is also connected by a wire 249 to all the key fingers 172, thus completing the line relay circuit with the battery supply at the other end of telegraph line 241 by means of the ground return. The opening or closing of this circuit de-energizes or energizes all line relays.

Contact 254 of the switch 145 is connected by a wire 255 to the contact ring 24.

Segment 21a represents the segment which is engaged by the contact 25 of the distributor arm 20 when the latter is at rest. The segment 21a is connected by a wire 260 to one contact of the switch 163, the opposite contact of which is connected by a wire 261 to the side of the line relay 190, to which the wires 240 and 249 are connected.

All machines are connected in series through the send-receive switches and may be used for sending or receiving. Normally, the send-receive switch 145 of each machine is in the receive position. At this time, the relay 190 is energized by the line current, and retains the switch 191 closed. This keeps the locking magnets 68 energized, at which time the clutch magnet is de-energized and the main shaft is locked in a stationary position.

When it is desired to send a message, the switch 145 is moved over to the send position. The motor switch 146 and clutch switch 148 are always on when the machine is ready to send or receive. The printing and tape-moving switch 147 may be on or off when a message is being sent depending upon whether the operator wants to print the message on the tape of his machine. When the machine is ready to receive or is receiving, the switch 147 must be in the "on" position. With the switch 145 in the send position, the line relay is energized since its circuit is completed by contact 254 of the switch, wire 255, ring 24, wire 27, contact 25, segement 21a, wire 260, closed switch 163, and wire 261.

When a key 150 is depressed, the tipping bar 160 opens the switch 163, thus de-energizing the line relay. At this time, the relay switch 191 opens and the locking magnets are de-energized. This releases the locking wheel 59 and closes the clutch switch 77 to energize the clutch magnet 48 to engage the discs of the clutch. The motor 55 now turns the main shaft 17 which turns the printing wheel 60, the locking wheel 59, and the distributor arm 20. The depression of the key 150 also moves its finger 172 into engagement with contact 178. When the distributor arm reaches the point where its contact 25 engages the segment of the depressed key, the circuit of the line relay is closed through wire 249 from the key to line relay and through relay to telegraph line 241, thus closing the relay switch to energize the locking magnets. The other side of the circuit from the segment 21 consists of contact 25, wire 27, contact 26, ring 24, wire 255, contact 254 of switch 145 to telegraph line 245. These locking magnets move the locking arm 70 to open the clutch switch 77 and de-energize the clutch magnet 48. At the same time, the locking wheel 59 is engaged to stop the main shaft. The symbol of the depressed key is now in line with the printing mechanism.

At the time the locking magnets were energized, the printing magnet switch 84 was closed to energize the printing magnet 88. This presses the tape against the selected symbol, as previously described, and it opens the tape-moving switch 97. It may be added here, that the cam switch 32 is held open by one of the projections 31 on the cam 30 when the distributor arm is in its rest position. This prevents printing or tape moving when the arm is at its rest position. However, as soon as the shaft starts to rotate, the cam switch is closed.

When the depressed key is released, the finger 172 is separated from the contact 178 to break the circuit of the line relay. The relay switch opens again to de-energize the locking magnets and allow the main shaft to rotate. The switch 163 is now closed, and if no other key is depressed, the relay magnet circuit is closed as soon as the contact 25 of the distributor arm engages the segment 21a. Thus the shaft is stopped and locked in position. At the time the finger 172 was separated from the contact 178 and the locking magnets were de-energized, the printing magnet switch 84 was opened, to de-energize the printing magnet. When this took place, the tape-moving switch 97 was closed to energize the tape-moving magnet 120. This caused the tape to move a predetermined distance, as previously described. It will be noted, that the tape cannot move until the printing magnet is de-energized after the printing operation.

If another key 150 is depressed immediately after the previous key is released, the distributor arm would keep moving until its contact 25 reached the segment 21 which is in circuit with the line relay. At this time the newly selected symbol is in line with the printing mechanism. The arm passes the rest position because switch 163 is opened before the arm reaches segment 21a. As long as the keys are speedily and consecutively depressed, segment 21a is by-passed until machine is allowed to come to rest. If operated slowly, printing will take place, then a rest, then printing again.

The action just described takes place in each machine connected with the one being operated, since the line relay of each of these machines is in series with the line relay of the operated machine. Thus, the same printing and tape-moving action takes place in all the machines, unless the operator wishes and cuts his machine out of operation by motor switch 146 or clutch switch 148.

When the send-receive switch 145 is moved to the receive position, another machine operated as described above, will operate this machine in the same manner. Actually, when the switch 145 is in the receiving position, the circuit of the segments 21, ring 24, contacts 25 and 26, switch 163 and keys 150 of the machine are out of operation.

All machines are connected into telegraph wire section 240 and 241 in the same manner. The test key 151 is not provided with a finger 172, so that when it is depressed it only tips the bar 160 to open the switch 163. This breaks the line relay circuit and de-energizes the locking magnets and allows the main shaft to rotate until the key is released. When the key is released, the shaft will rotate until the distributor arm returns to the rest position, at which time the line relay circuit is closed through segment 21a and the locking magnets energized to disconnect the shaft from the motor and to lock it in position.

It will be found in operation that machine will come to rest position very frequently during typing-transmission, the frequency of stopping depending on the combination of letters forming the words transmitted. This keeps all the machines synchronized and allows for variations in typing speeds. This stopping does not interfere with typing, as machine may print and come to rest before the next key is depressed. This synchronizing action takes place most frequently when keys at extreme right of keyboard are depressed and followed by depressed keys at extreme left of keyboard, as the arm 20 may reach segment 21a before contact is established by key 150 of another segment 21.

The complete set of symbols may be transmitted with one-half revolution of main shaft, provided keys 150 are depressed in sequence. Since the operation is an advance one, from segment to segment, in the same given time (21 and 21a included) all machines advancing the same distance is part of the synchronizing operation. All machines stop and start from the same position at the same given time, whether from a segment 21 or 21a. Time factor also is an element here, since all machines take the same time from rest position 21a to a selected segment 21, the same timing applies from segment to segment.

Figures 11, 12, 13:
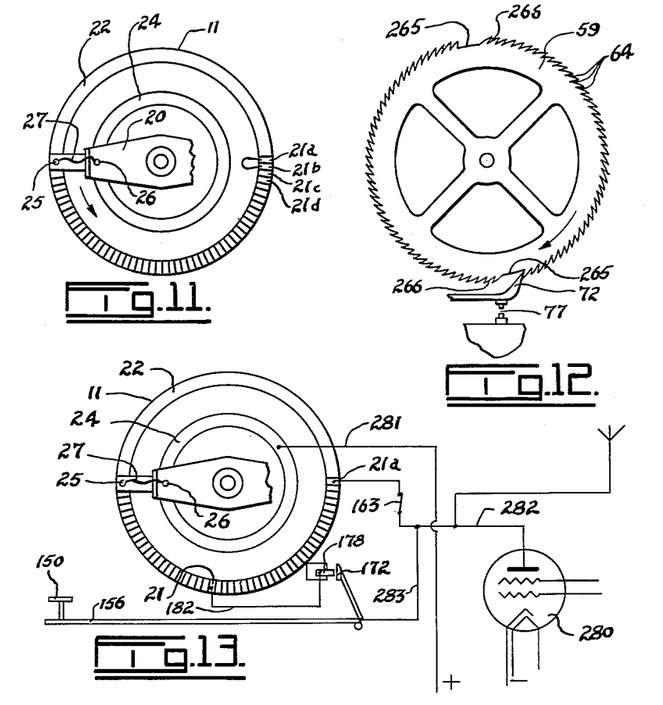

Figure 11 diagrammatically illustrates a signal panel 11 and Figure 12 shows a locking wheel 59 which could be employed automatically to synchronize a transmitting machine with the receiving machines should any one of them get a symbol ahead or behind. In this example, segments 21a and 21b are electrically connected together. There is a pair of these contacts at the rest position of the distributor arm. Assuming that the distributor arm rotates in an anti-clockwise direction, segments 21c and 21d which are located immediately before segments 21a and 21b, having regard to the direction of rotation of the arm, are blanks, that is, they are not connected in any electrical circuit.

The locking wheel is provided with the notches 64. However, at each point thereon corresponding to the rest position of the distributor arm, there is an elongated notch 265 which is the equivalent of three of the notches 64. Another notch 266 is provided at the forward end of the elongated notch, when considering the latter with respect to the direction of rotation of the wheel. Actually, the notches 265 and 266 cover the portion of the periphery of the wheel which corresponds with the segments 21a, 21b, 21c and 21d.

If for any reason whatever, a receiving machine got one symbol and consequently, one notch of the locking wheel behind the sending machine, when the distributor arm of the latter reached the rest position where it engages segment 21a, the distributor arm of the receiver would be in position relative to its segment 21b. At this time, the locking arms of these machines would be trying to lock the wheels 59 in position since the transmitter has started the rest pulse at segment 21b and receiver's locking magnets will have been energized at its relative position 21c. The locking wheel of the transmitter would stop at 21a, and the locking finger of the receiver would enter the elongated notch 265 so that its wheel will not stop until the finger reaches the end of said notch, thereby catching up to the transmitter. The two machines are now synchronized. This action is reversed should the receiver get one symbol ahead of the transmitter. When the distributor arm contact of the transmitter engages segment 21b, it starts the locking magnet pulse, and the locking finger of the receiver engages the end of the notch 265 to stop the locking wheel. At the same time, the locking finger of the transmitter is in the elongated notch and the wheel is not stopped until the finger engages the end of the notch, thereby catching up with the receiver.

The notch 266 corresponds with the relative position of segment 21d. If the last symbol to be transmitted corresponds with the notch 64 immediately ahead of the notch 266, the locking finger of the receiver would be in the latter when the locking finger of the transmitter was in said notch 64, if the receiver is one symbol ahead of the transmitter. At this time, the symbol corresponding to this notch 64 would be sent by the transmitter, but it would not be printed by the receiver since the equivalent position of the segment 21d in the printing wheel has no symbol thereon. However, if under these circumstances notch 266 were omitted, the locking finger of the receiver would enter the elongated notch, and this would result in the transmitter being locked in position for printing the last symbol on wheel 60, and the receiver being locked at rest position, so that continued typing on transmitter would release the receiver additional notches further ahead of the transmitter.

If machines are in the foregoing described relative positions, correction would occur at the first rest position action of the transmitter, the transmitter releasing the receiver locking finger as well as its own locking finger, both entering the notches 265, one slightly behind the other, and continue rotation until transmitter starts rest pulse at 21b, thereby energizing receiver locking magnets and causing locking finger to engage end of notch 265, the transmitter also locking at notch 265, immediately following. Both machines are now at same rest position.

If machines get out of alignment as described in foregoing, correction will be made only when machines enter section of wheel 59, immediately prior to rest position and since frequent resting occurs during transmission, re-alignment will be automatic, or machines can be made to re-align by depressing test key 151.

Figure 13 diagrammatically illustrates a wiring hook-up with a radio transmitting circuit. A transmitting type tube 280 is connected in a transmitting radio circuit in the usual manner. The switch 163 and the switches formed by the fingers 172 and the contacts 178 of the keys of this machine are connected in parallel in the high voltage supply line of the plate of this tube. In this example, a high voltage supply line 281 of the plate of the tube is connected to the contact ring 24, while the switch 163 is connected to the plate by a wire 282 and each finger 172 is connected to said plate by a wire 283. Thus, when the distributor arm is at rest position, the plate of the tube is connected to its high voltage supply, and when the arm is moved away from this position, the circuit is broken until the arm reaches the segment of the key being depressed, at which time the circuit is restored. In other words, this action makes and breaks the positive voltage supply to the plate. When the circuit is closed, the tube is oscillating in the usual manner and sends a continuous wave signal to the antenna circuit, said signal being picked up by a radio receiver connected to similar apparatus.

Figure 14:
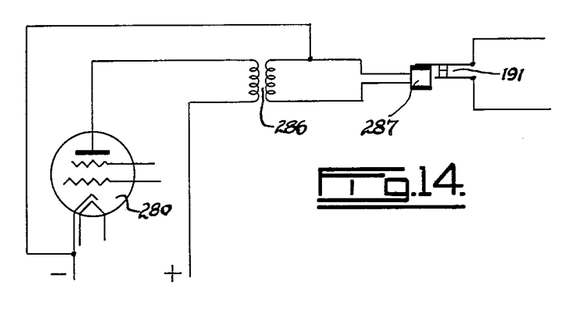

Figure 14 diagrammatically illustrates an out-put transformer 286 of a radio receiver circuit. Secondary winding of this transformer is connected to a sensitive relay 287 which controls a relay switch 191 of the telegraphic machine.

The continuous wave signal referred to above is picked up by the radio receiver and causes an increase in the milliamperage value of current in the secondary winding of the out-put transformer 286. This increase actuates the armature of the sensitive relay 287 to keep the contacts of the switch 191 closed. At this time, the locking magnets are energized as described above.

The telegraphic apparatus functions in exactly the same manner in a radio hook-up as it does with a telegraphic line hook-up.

What I claim as my invention is:

1. In telegraphic apparatus, a rotatably-mounted main shaft, means normally locking the shaft against rotation, a positive clutch through which the shaft may be selectively rotated, rotating means connected to the clutch, means operatively connected to the clutch to engage and disengage the latter, said clutch normally being disengaged, and magnet means operated by a signal pulse consecutively to release the locking means to free the shaft and cause the clutch operating means to engage the clutch to permit the shaft to be rotated by the rotating means, said magnet means being operated at the termination of the pulse to disengage the clutch and cause the locking means to stop the shaft.

2. In telegraphic apparatus, a rotatably-mounted main shaft, a locking wheel fixed on the shaft having a plurality of notches formed therein, a locking arm mounted adjacent the wheel and a tooth normally engaging a wheel notch to lock the shaft against rotation, a positive clutch through which the shaft may be selectively rotated, rotating means connected to the clutch, means connected to the clutch and operated by an electro magnet to engage and disengage the clutch, said clutch normally being disengaged, magnet means operated by a signal pulse for moving the locking arm to free the shaft, and a switch operated by the locking arm when it is moved to free the shaft for causing the electro magnet to engage the clutch, said magnet means being operated at the termination of the pulse consecutively to permit the locking arm to move and operate the switch to cause the electro magnet to disengage the clutch and to lock the shaft.

3. In telegraphic apparatus, a rotatably-mounted main shaft, means normally locking the shaft against rotation, a positive clutch through which the shaft may be selectively rotated, rotating means connected to the clutch, means operatively connected to the clutch to engage and disengage the latter, said clutch normally being disengaged, a printing wheel fixed to the shaft, a plurality of symbols on the printing wheel, means near the wheel movable through the latter for pressing a tape against a wheel symbol when said wheel is stopped, magnet means operated by a signal pulse consecutively to release the locking means to free the shaft and cause the clutch operating means to engage the clutch to permit the shaft to be rotated by the rotating means, said magnet means being operated at the termination of the pulse to disengage the clutch and cause the locking means to stop the shaft, a printing magnet connected to the pressing means for operating the latter, and switch means operated by the magnet means after the latter has been operated to stop the shaft to operate the printing magnet to cause the pressing means to be moved towards the printing wheel, said switch means being operated by the magnet means when said magnet means is operated to release the shaft to cause the printing magnet to move the pressing means away from the printing wheel.

4. Telegraphic apparatus as claimed in claim 3 including means for intermittently moving a tape past the printing wheel, comprising a drum upon which the tape is wound, a ratchet for intermittently rotating the drum a predetermined distance each time it is operated, a tape moving magnet connected to the ratchet for operating the latter, and a switch operated by the printing magnet when it moves the pressing means towards the tape to cause the tape magnet to stop said tape, said switch being operated by the printing magnet when it moves the pressing means away from the tape to cause the tape magnet to move the tape a predetermined distance through the ratchet.

5. Telegraphic apparatus as claimed in claim 3 including a distributor arm mounted on and radiating from the main shaft, a plurality of spaced segments in the path of the arm, said segments being connected in parallel in a signal-sending circuit, said circuit providing signal pulses for the magnet means and for magnet means in other similar apparatus, contact means on the arm and in the circuit adapted to engage the segments to close the circuit, a plurality of keys representing the symbols of the printing wheel, each key corresponding to a segment, a normally-open switch for each key which is closed when the key is depressed, each switch being connected to the circuit and to the segment corresponding to its key, and means for opening the circuit when any key is depressed, said circuit being closed when the contact means on the distributor arm engages the segment corresponding to the depressed key.

6. Telegraphic apparatus as claimed in claim 5 in which there is a rest segment which does not correspond to a key, said segment being connected in parallel with the other segments in the signal-sending circuit and being engaged by the contact means when the arm is in its normal rest position, and said circuit being closed when the contact means on the distributor arm engages said rest segment and no key is depressed.

7. Telegraphic apparatus as claimed in claim 6 including a second rest segment beside the first segment electrically connected to the latter, said second rest segment being free of the signal-sending circuit excepting through its connection to the first rest segment.

8. Telegraphic apparatus as claimed in claim 7 including switch means on the main shaft for putting the printing magnet out of operation when the contact means on the distributor arm engages the rest segment.

9. Telegraphic apparatus as claimed in claim 8 including a manually-operable switch for selectively putting the printing magnet out of operation.

10. Telegraphic apparatus as claimed in claim 9 including a manually-operable switch for selectively breaking the signal-sending circuit.

11. In telegraphic apparatus, a rotatably-mounted main shaft, a locking wheel fixed on the shaft having a plurality of notches formed therein, a locking arm mounted adjacent the wheel and a tooth normally engaging a wheel notch to lock the shaft against rotation, a positive clutch through which the shaft may be selectively rotated, rotating means connected to the clutch, means connected to the clutch and operated by an electromagnet to engage and disengage the clutch, said clutch normally being disengaged, magnet means operated by a signal pulse for moving the locking arms to free the shaft, a switch operated by the locking arm when it is moved to free the shaft for causing the electromagnet to engage the clutch, said magnet means being operated at the termination of the pulse consecutively to permit the locking arm to move and operate the switch to cause the electromagnet to disengage the clutch and to lock the shaft, a printing wheel fixed to the shaft, a plurality of symbols on the printing wheel, there being a notch in the locking wheel for each symbol, means near the wheel movable towards the latter for pressing a tape against a wheel symbol when the shaft and wheel are stopped, and a distributor arm mounted on and radiating from the main shaft, a plurality of spaced segments in the path of the arm, there being one segment for each symbol on the printing wheel, said segments being connected in parallel in a signal-sending circuit, said circuit providing signal pulses for the magnet means and for magnet means in other similar apparatus, contact means on the arm and in the circuit adapted to engage the segments to close the circuit, a plurality of keys representing the symbols of the printing wheel, each key corresponding to a segment, a normally-open switch for each key which is closed when the key is depressed, each switch being connected to the circuit and to the segment corresponding to its key, and means for opening the circuit when any key is depressed, said circuit being closed when the contact means on the distributor arm engages the segment corresponding to the depressed key.

12. Telegraphic apparatus as claimed in claim 11 in which there is a rest segment which does not correspond to a key, said segment being connected in parallel with the other segments in the signal-sending circuit and being engaged by the contact means when the arm is in its normal rest position, and said circuit being closed when the contact means on the distributor arm engages said rest segment and no key is depressed.

13. Telegraphic apparatus as claimed in claim 12 including another segment beside the first segment electrically connected to the latter, said second rest segment being free of the signal-sending circuit excepting through its connection to the first rest segment.

14. Telegraphic apparatus as claimed in claim 13 including two further blank segments by the second rest segment, said blank segments being free of the signal-sending circuit, and an elongated notch and an extra notch beside the latter in the locking wheel corresponding to the two rest and two blank segments.

15. In telegraphic apparatus, a rotatably-mounted main shaft, means normally locking the shaft against rotation, a positive clutch through which the shaft may be selectively rotated, rotating means connected to the clutch means operatively connected to the clutch to engage and disengage the latter, said clutch normally being disengaged, magnet means operated by a signal pulse consecutively to release the locking means to free the shaft and cause the clutch operating means to engage the clutch to permit the shaft to be rotated by the rotating means, said magnet means being operated at the termination of the pulse to disengage the clutch and cause the locking means to stop the shaft, printing means, and means operated by the magnet means after the latter has been operated to stop the shaft to start the printing means, said printing means being stopped when the magnet means is operated to free the shaft.

16. In telegraphic apparatus, a rotatably-mounted main shaft, a locking wheel fixed on the shaft having a plurality of notches formed therein, a locking arm mounted adjacent the wheel and a tooth normally engaging a wheel notch to lock the shaft against rotation, a positive clutch through which the shaft may be selectively rotated, rotating means connected to the clutch, means connected to the clutch and operated by an electromagnet to engage and disengage the clutch, said clutch normally being disengaged, magnet means operated by a signal pulse for moving the locking arm to free the shaft, a switch operated by the locking arm when it is moved to free the shaft for causing the electromagnet to engage the clutch and to lock the shaft, printing means, and means operated by the magnet means after the latter has been operated to stop the shaft to start the printing means, said printing means being stopped when the magnet means is operated to free the shaft.

References Cited in the file of this patent

UNITED STATES PATENTS

| Number | Name | Date |
|---|---|---|
| 902,792 | Agrell | Nov. 3, 1908 |
| 1,847,030 | Watson | Feb. 23, 1932 |
| 1,933,376 | Kain | Oct. 31, 1933 |
| 2,074,037 | Watson | Mar. 16, 1937 |
| 2,082,575 | Harrison | June 1, 1937 |
| 2,090,203 | Hiltz | Aug. 17, 1937 |
| 2,181,708 | Reiber | Nov. 28, 1939 |
| 2,338,275 | Zenner | Jan. 4, 1944 |
| 2,408,754 | Bush | Oct. 8, 1946 |
| 2,487,118 | Estoup | Nov. 8, 1949 |
| 2,549,028 | Spencer et al. | Apr. 17, 1951 |
| 2,658,942 | Durkee | Nov. 10, 1953 |